(12) United States Patent
Leier et al.

(10) Patent No.: US 11,603,134 B2
(45) Date of Patent: Mar. 14, 2023

(54) ENERGY ATTENUATING LONGITUDINAL FRAME MEMBER FOR A VEHICLE INCLUDING ASYMMETRIC CRASH RESPONSE

(71) Applicant: GM GLOBAL TECHNOLOGY OPERATIONS LLC, Detroit, MI (US)

(72) Inventors: Bradley Leier, Troy, MI (US); Mohammed N. Shaik, Canton, MI (US); Ron J. Taulbee, Sterling Heights, MI (US); Mohamed Darsot, Detroit, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 196 days.

(21) Appl. No.: 17/065,766

(22) Filed: Oct. 8, 2020

(65) Prior Publication Data
US 2022/0111900 A1 Apr. 14, 2022

(51) Int. Cl.
*B62D 21/15* (2006.01)
*B62D 65/02* (2006.01)
*B60R 19/34* (2006.01)

(52) U.S. Cl.
CPC .............. *B62D 21/15* (2013.01); *B60R 19/34* (2013.01); *B62D 65/024* (2013.01)

(58) Field of Classification Search
CPC ........ B62D 21/15; B62D 65/024; B60R 19/34
USPC ........................................................ 280/784
See application file for complete search history.

(56) References Cited

U.S. PATENT DOCUMENTS

| 5,431,445 A * | 7/1995 | Wheatley ............. B62D 21/152 296/187.03 |
| 6,474,709 B2 * | 11/2002 | Artner .................... B60R 19/34 296/193.06 |
| 6,554,176 B2 * | 4/2003 | McGill ................ B23K 26/262 228/112.1 |
| 7,651,155 B2 | 1/2010 | Tan et al. |
| 7,677,617 B2 * | 3/2010 | Stewart ................... B60R 19/34 293/133 |
| 8,561,877 B2 | 10/2013 | Carlson et al. |
| 8,585,129 B2 * | 11/2013 | Mori .................... B62D 21/152 296/187.09 |
| 8,662,546 B2 * | 3/2014 | Kizaki .................... B60R 19/18 293/133 |
| 9,079,553 B2 * | 7/2015 | Banasiak .............. B60R 19/023 |
| 9,266,486 B2 | 2/2016 | Iino et al. |
| 9,403,498 B2 * | 8/2016 | Hoschouer ............. B60R 19/34 |
| 9,663,147 B2 | 5/2017 | Kuriyama et al. |
| 10,065,468 B2 | 9/2018 | Virupaksha et al. |
| 10,106,113 B2 * | 10/2018 | Ciklakarsli ............. B60R 19/34 |
| 10,207,740 B2 * | 2/2019 | Yamada ................ B62D 21/152 |
| 10,214,243 B2 * | 2/2019 | Elbkaily ................ B62D 21/15 |
| 10,507,776 B2 | 12/2019 | Newcomb et al. |
| 10,518,811 B2 * | 12/2019 | Harpster ................ B62D 25/08 |
| 10,926,801 B2 * | 2/2021 | Stainer ................... B62D 21/11 |

(Continued)

OTHER PUBLICATIONS

Office Action for German Application No. 10 2021 112 029.2; Report dated Jan. 12, 2022 (pp. 1-9).

*Primary Examiner* — Toan C To
(74) *Attorney, Agent, or Firm* — Cantor Colburn LLP

(57) ABSTRACT

A frame for a vehicle includes a bumper support frame member, and a longitudinal frame member coupled to the bumper support frame member. The longitudinal frame member includes a rail member having an asymmetric crash response.

15 Claims, 6 Drawing Sheets

(56) References Cited

U.S. PATENT DOCUMENTS

| | | | |
|---|---|---|---|
| 2005/0179268 A1* | 8/2005 | Kollaritsch | B60R 19/34 293/133 |
| 2005/0253403 A1* | 11/2005 | Longo | F16F 7/125 293/133 |
| 2006/0237976 A1* | 10/2006 | Glasgow | B21C 37/158 293/132 |
| 2008/0106107 A1* | 5/2008 | Tan | B60R 19/34 293/133 |
| 2009/0001737 A1* | 1/2009 | Salomonsson | B60R 19/34 293/133 |
| 2010/0019518 A1* | 1/2010 | Stewart | B60R 19/34 293/133 |
| 2010/0109354 A1* | 5/2010 | Agrahari | B60R 19/34 293/120 |
| 2011/0291431 A1* | 12/2011 | Buschsieweke | C22C 38/28 293/133 |
| 2016/0245357 A1* | 8/2016 | Cazes | F16F 7/12 |
| 2018/0290611 A1* | 10/2018 | Munjurulimana | B62D 65/16 |
| 2020/0164817 A1* | 5/2020 | Frost | B60R 19/023 |
| 2021/0053518 A1* | 2/2021 | Karlsson | B60R 19/34 |
| 2021/0276630 A1* | 9/2021 | Aitoh | B62D 25/08 |

* cited by examiner

ENERGY ATTENUATING LONGITUDINAL FRAME MEMBER FOR A VEHICLE INCLUDING ASYMMETRIC CRASH RESPONSE

INTRODUCTION

The subject disclosure relates to the art of vehicles and, more particularly, to an energy attenuating rail having an asymmetric energy crash response.

In a forward crash, it is desirable to dissipate crash energy and channel crash forces away from vehicle occupants. A bumper may include an energy attenuation system that absorbs a portion of crash energy through a stroking mechanism. The stroking mechanism may include telescoping component that collapse when exposed to crash forces. Other systems allow longitudinal rails to crush or fold.

There is a trade-off between designing longitudinal rails to fold and to also maintain a desired load carrying capacity. Increasing load carrying capacity also increases the crash loads needed to fold the longitudinal rails. Decreasing the load carrying capacity places limitations on engine design, passenger carrying capacity and the like. Therefore, the industry would welcome a longitudinal rail design that can increase structure impact performance, and robustness while also increasing load carrying capacity.

SUMMARY

In one exemplary embodiment, a frame for a vehicle includes a bumper support frame member, and a longitudinal frame member coupled to the bumper support frame member. The longitudinal frame member includes a rail member having an asymmetric crash response.

In addition to one or more of the features described herein the rail member includes an outboard rail element, an inboard rail element, an upper rail element, and a lower rail element, the upper rail element and the lower rail element extending between and connecting with the outboard rail element and the inboard rail element.

In addition to one or more of the features described herein the outboard rail element exhibits a first response to an axial force and the inboard rail element exhibits a second response to the axial force, the second response being greater than the first response.

In addition to one or more of the features described herein the outboard rail element includes a first thickness and the inboard rail element includes a second thickness that is greater than the first thickness.

In addition to one or more of the features described herein at least one cross member extending between the inboard rail element and the outboard rail element spaced from the upper rail element and the lower rail element, the at least one cross member defining first and second cells that extend longitudinally through the rail member.

In addition to one or more of the features described herein an insert extending through the bumper support frame member to the rail member.

In addition to one or more of the features described herein the insert is directly attached to the outboard rail element.

In addition to one or more of the features described herein the insert includes a first insert is directly attached to the outboard rail element at the upper rail element and a second insert directly attached to the outboard rail element at the lower rail element.

In another exemplary embodiment, a vehicle includes a body having a passenger compartment, a pair of front wheels, a pair of rear wheels, and a frame supporting the body, the pair of front wheels, and the pair of rear wheels. The frame includes a bumper support frame member and a longitudinal frame member coupled to the bumper support frame member. The longitudinal frame member includes a rail member having an asymmetric crash response.

In addition to one or more of the features described herein the rail member includes an outboard rail element, an inboard rail element, an upper rail element, and a lower rail element, the upper rail element and the lower rail element extending between and connecting with the outboard rail element and the inboard rail element.

In addition to one or more of the features described herein the outboard rail element exhibits a first response to an axial force and the inboard rail element exhibits a second response to the axial force, the second response being greater than the first response.

In addition to one or more of the features described herein the outboard rail element includes a first thickness and the inboard rail element includes a second thickness that is greater than the first thickness.

In addition to one or more of the features described herein at least one cross member extending between the inboard rail element and the outboard rail element spaced from the upper rail element and the lower rail element, the at least one cross member defining first and second cells that extend longitudinally through the rail member.

In addition to one or more of the features described herein an insert extending through the bumper support frame member to the rail member.

In addition to one or more of the features described herein the insert is directly attached to the outboard rail element.

In addition to one or more of the features described herein the insert includes a first insert is directly attached to the outboard rail element at the upper rail element and a second insert directly attached to the outboard rail element at the lower rail element.

In another exemplary embodiment, a method of forming a vehicle frame includes forming a longitudinal frame member having an asymmetric crash response.

In addition to one or more of the features described herein forming the longitudinal frame element includes forming a rail member having an outboard rail element, an inboard rail element, an upper rail element, and a lower rail element.

In addition to one or more of the features described herein forming the rail member includes forming the outboard rail element to exhibit a first response to an axial force and forming the inboard rail element to exhibit a second response to the axial force that is greater than the first response.

In addition to one or more of the features described herein the method also includes connecting a bumper support frame member to the longitudinal rail member and providing an insert in the bumper support frame member that directly connected with the outboard rail element.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
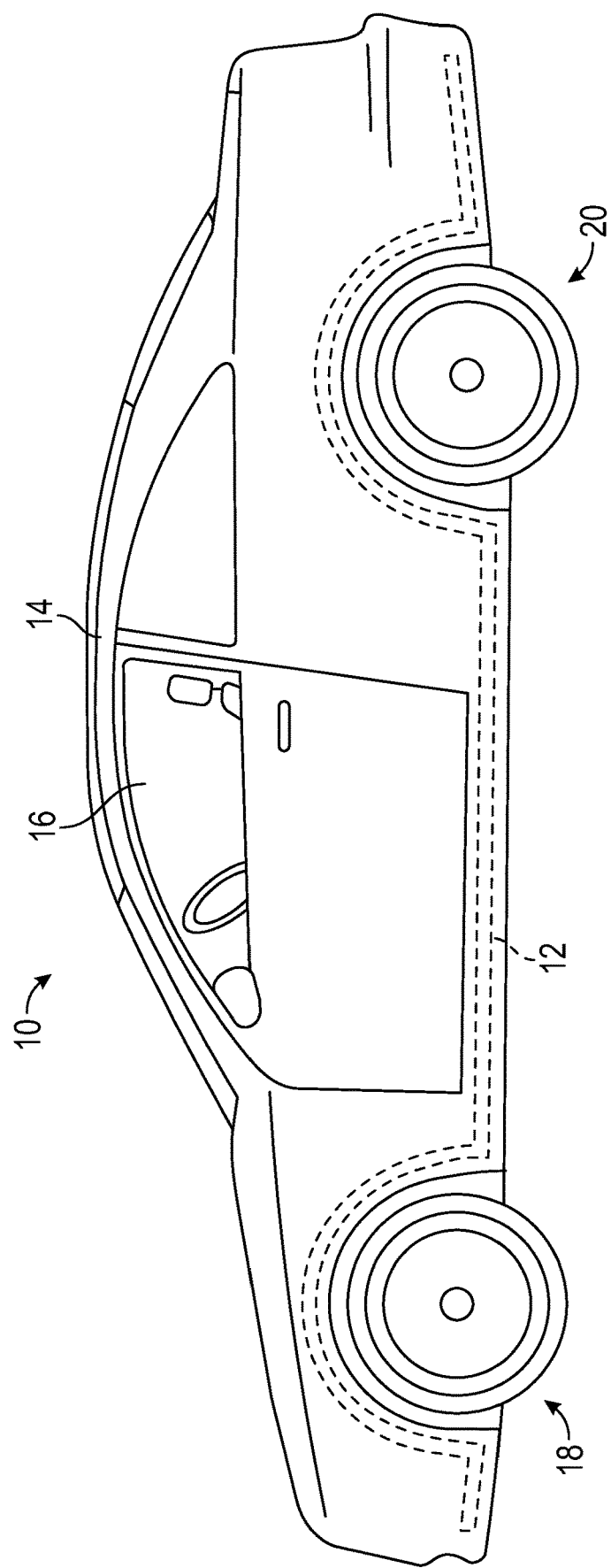
FIG. 1 depicts a vehicle having a chassis including a longitudinal rail member with an asymmetric transfer profile, in accordance with an exemplary embodiment.

The following description is merely exemplary in nature and is not intended to limit the present disclosure, its application or uses. It should be understood that throughout the drawings, corresponding reference numerals indicate like or corresponding parts and features.

A vehicle, in accordance with an exemplary embodiment, is indicated generally at 10 in FIG. 1. Vehicle 10 includes a chassis 12 that supports a body 14 having a passenger compartment 16. Chassis 12 also supports a pair of front wheels 18 and a pair of rear wheels 20. As will be detailed herein, chassis 12 includes an energy attenuating frame 30 that is designed to reduce crash forces on occupants in passenger compartment 16. Energy attenuating frame 30 is also designed to include a specific response to low energy impacts. The specific response mitigates damage to several frame components allowing vehicle 10 to be repaired and placed back into service.

Figure 2:
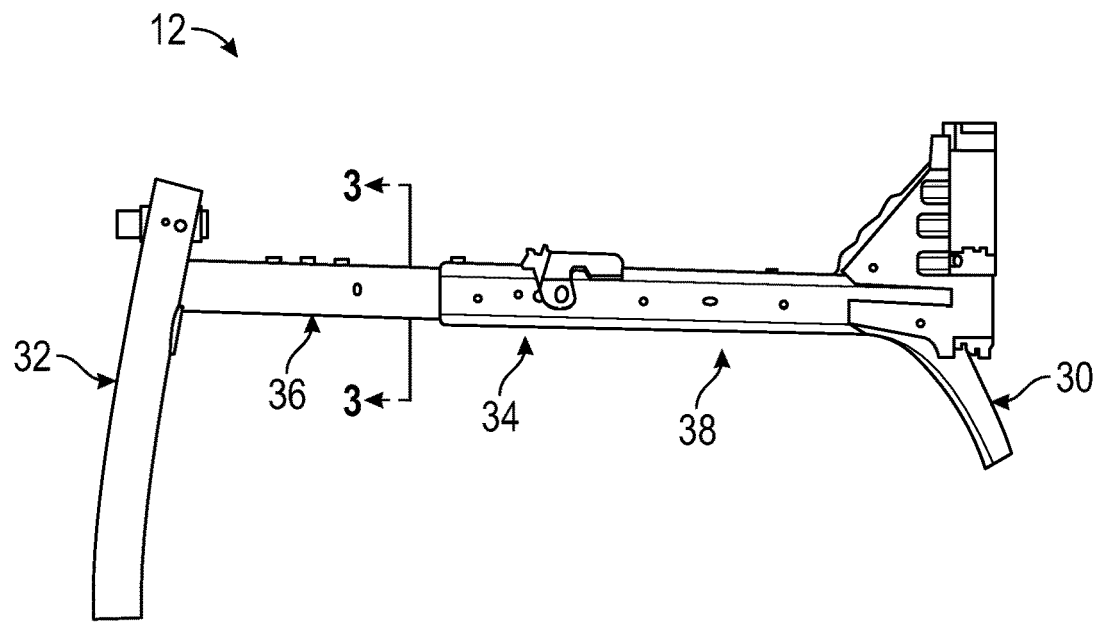
FIG. 2 is a partial view of the vehicle chassis depicting a bumper support frame member connected to the longitudinal frame member having the asymmetric transfer profile, in accordance with an exemplary embodiment.

As shown in FIG. 2, energy attenuating frame 30 includes a bumper support frame member 32, a first longitudinal frame member 34 and a second longitudinal frame member (not shown). First longitudinal frame member 34 includes a first rail member 36 that is mechanically connected to a second rail member 38. First rail member 36 is designed to exhibit an asymmetric energy response to forces acting upon, for example, bumper support frame member 32. The asymmetric response results in a particular folding pattern as will be detailed herein.

Figure 3:
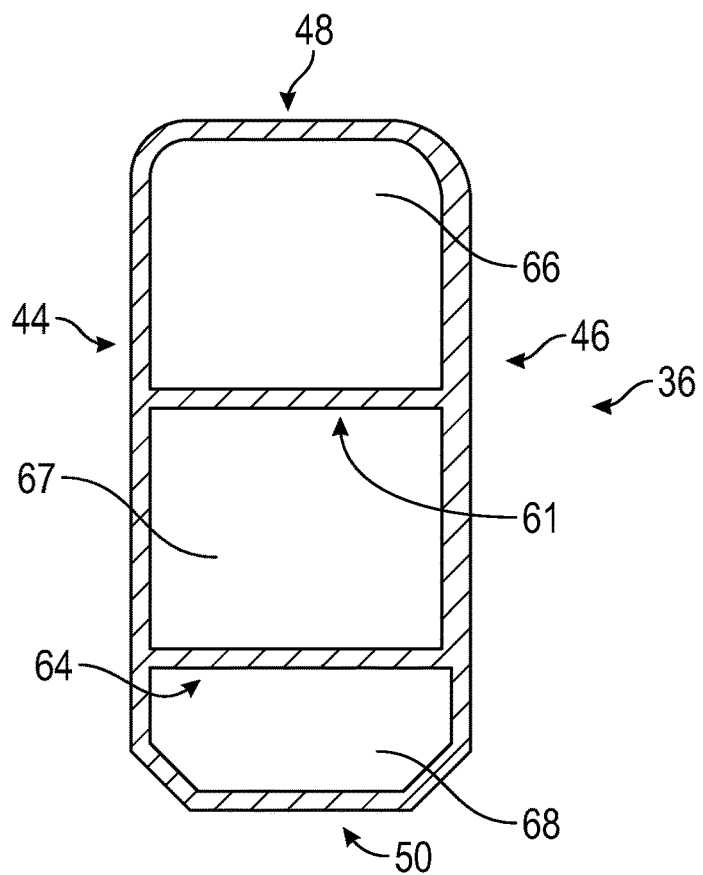
FIG. 3 is a cross-sectional end view of the longitudinal frame member having the asymmetric transfer profile taken along the line 3-3 in FIG. 2, in accordance with an exemplary embodiment.

Referring to FIG. 3, first rail member 36 includes an outboard rail element 44, an inboard rail element 46, an upper rail element 48, and a lower rail element 50. Upper and lower rail elements 48 and 50 extend between and connect with outboard rail element 44 and inboard rail element 46. A first cross member 61 extends between outboard rail element 44 and inboard rail element 46 spaced from upper rail element 48 and a second cross member 64 extends between outboard rail element 44 and inboard rail element 46 spaced from lower rail element 50. First and second cross members 61 and 64 define a first cell 66, a second cell 67 and a third cell 68 that extend longitudinally through first rail member 36.

Figure 4:
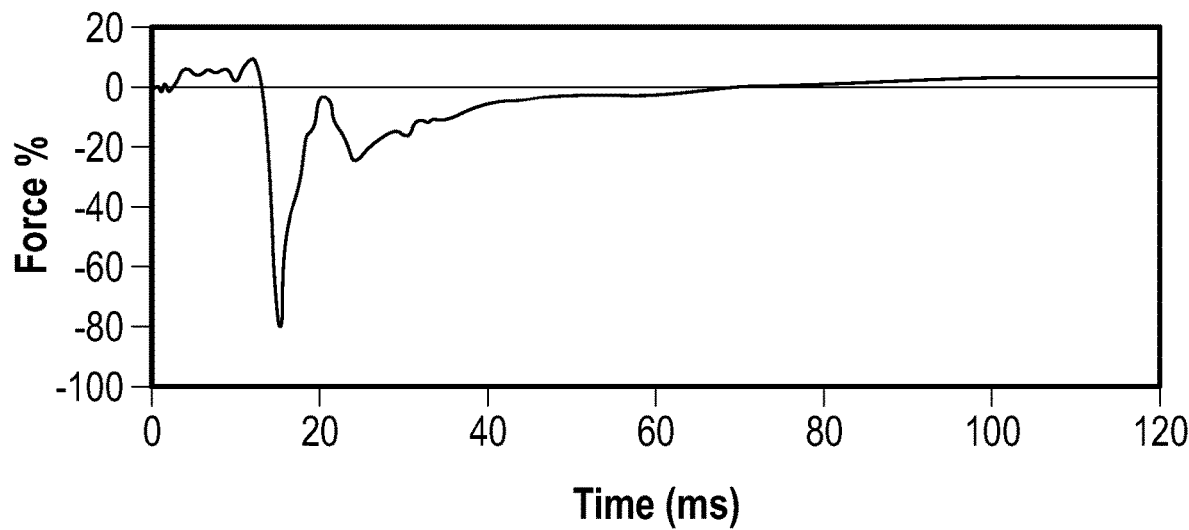
FIG. 4 is a graph depicting a response by an outboard rail element of the longitudinal frame member to a load input, in accordance with an exemplary aspect.
Figure 5:
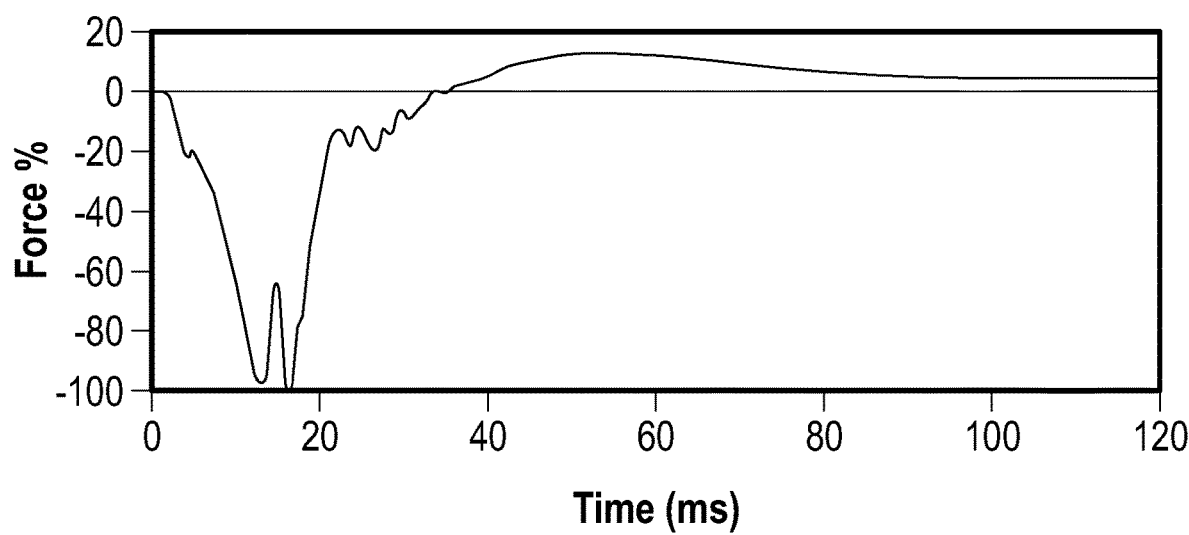
FIG. 5 is a graph depicting a response by an inboard rail element of the longitudinal frame member to the load input, in accordance with an exemplary aspect.
Figure 6:
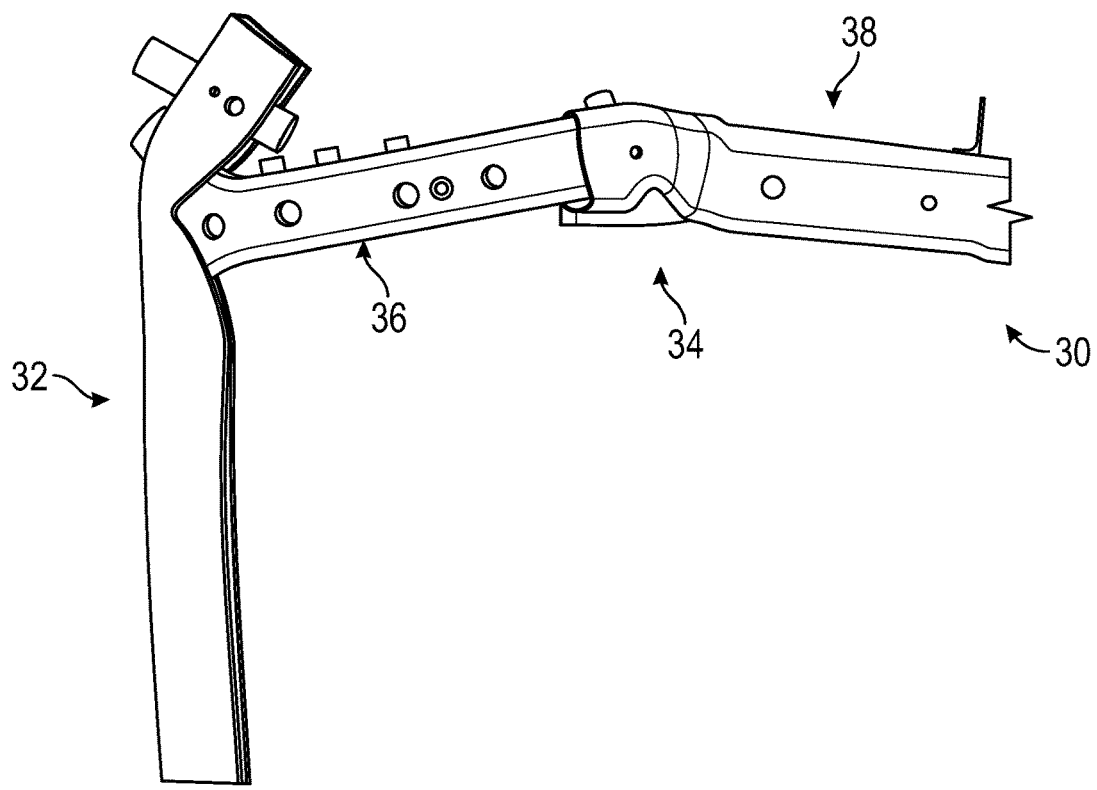
FIG. 6 depicts a first portion of a response by the longitudinal rail member to the load input, in accordance with an exemplary embodiment.
Figure 7:
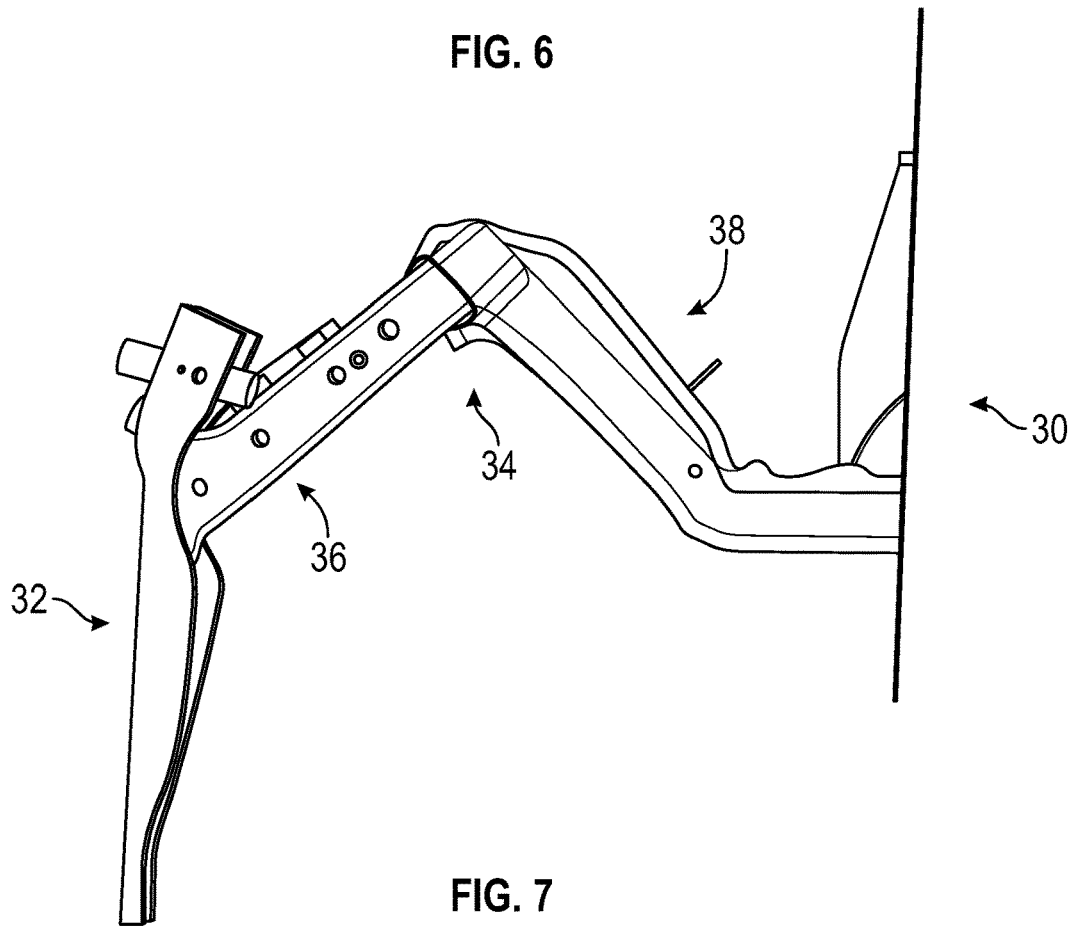
FIG. 7 depicts a second portion of a response by the longitudinal rail member to the load input, in accordance with an exemplary embodiment.

In accordance with an exemplary embodiment, outboard rail element 44 includes a first thickness and inboard rail element 46 includes a second thickness that is greater than the first thickness. Outboard rail element 44 is configured to buckle before inboard rail element 46. That is, outboard rail element 44 has a lower force response, as shown in FIG. 4, than inboard rail element 46, as shown in FIG. 5. This asymmetric force response results in first rail member 36 folding before second rail member 38 as shown in FIG. 6. If the force is above a selected force threshold, second rail member 38 may also bend or fold as shown in FIG. 7. However, if the impact force is below the selected force threshold, only first rail member 36 may bend. In such a case, a simple replacement of first rail member 36 may allow vehicle 10 to be placed back into service.

Figure 8:
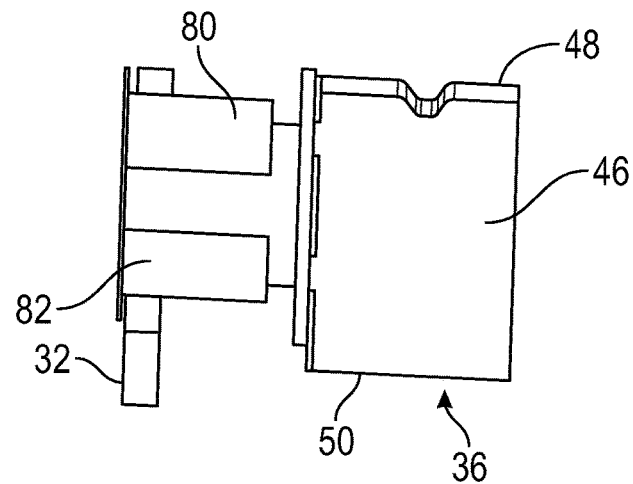
FIG. 8 depicts a side elevational view of first and second insert members extending through the bumper support frame member to the longitudinal rail member.
Figure 9:
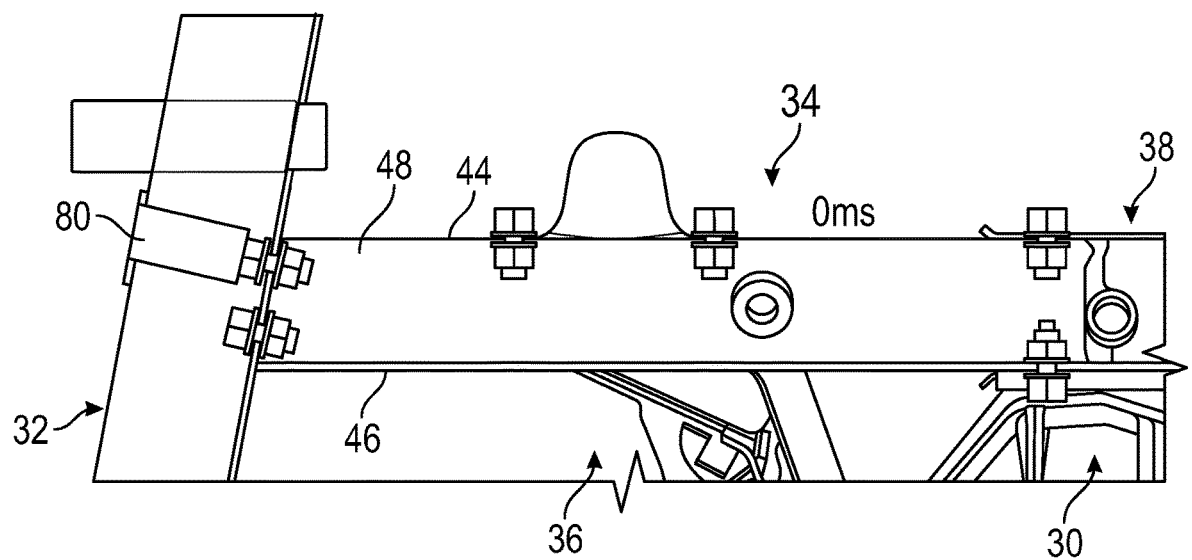
FIG. 9 depicts a top cross-sectional view of the second insert member of FIG. 8, in accordance with an exemplary embodiment.
Figure 10:
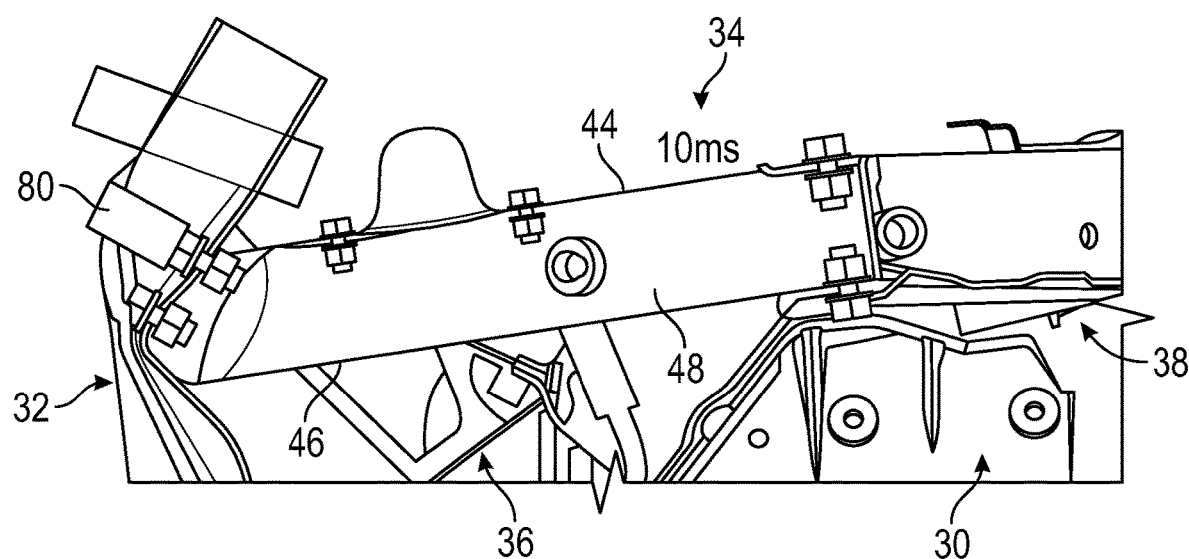
FIG. 10 depicts the second insert member transferring load into the outboard rail element, in accordance with an exemplary aspect.

In accordance with an exemplary embodiment shown in FIGS. 8 and 9 a first insert 80 may be provided in bumper support frame 32 and connected to outboard rail element 44 at upper rail element 48 and a second insert 82 may be provided in bumper support frame 32 and connected to outboard rail element 44 at lower rail element 50. Inserts 80 and 82 provide a direct load path for forces passing from bumper support frame member 32 to outboard rail element 44. The direct load path promotes the bending or collapsing of outboard rail element 44 as shown in FIG. 10.

In accordance with another exemplary aspect, first rail member 36 may be a hybrid system. For example, outboard rail element 44 may be formed from a first material and inboard rail element 46 may be formed from a second material. The first material and the second material may include different material or physical properties. In an embodiment, the first material may have a first strength or a first stiffness and the second material may have a second strength or a second stiffness. Upper rail element 48 and lower rail element 50 may also be hybrid members. The particular selection, and connection of the materials would achieve a selected asymmetric response to forces acting upon, for example bumper support frame member 32.

At this point, it should be understood that the rail member in accordance with the exemplary embodiments exhibits an asymmetric bending response to axial loading. The asymmetric response creates an imbalanced load that generates a moment on the longitudinal rail. The moment induces a repeatable buckle mode and also increases an overall rail capacity, more efficiently dissipates energy in a crash event that may accommodate larger power trains while reducing potential passenger compartment incursions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A frame for a vehicle comprising:
a bumper support frame member; and
a longitudinal frame member coupled to the bumper support frame member, the longitudinal frame member including a rail member including an outboard rail element, an inboard rail element, an upper rail element, and a lower rail element, the upper rail element and the lower rail element extending between and connecting with the outboard rail element and the inboard rail element having an asymmetric crash response wherein the outboard rail element exhibits a first response to an axial force and the inboard rail element exhibits a second response to the axial force, the second response being greater than the first response.

2. The frame according to claim 1, wherein the outboard rail element includes a first thickness and the inboard rail element includes a second thickness that is greater than the first thickness.

3. The frame according to claim 1, further comprising at least one cross member extending between the inboard rail element and the outboard rail element spaced from the upper rail element and the lower rail element, the at least one cross member defining first and second cells that extend longitudinally through the rail member.

4. The frame according to claim 1, further comprising an insert extending through the bumper support frame member to the rail member.

5. The frame according to claim 4, wherein in the insert is directly attached to the outboard rail element.

6. The frame according to claim 5, wherein the insert includes a first insert directly attached to the outboard rail element at the upper rail element and a second insert directly attached to the outboard rail element at the lower rail element.

7. A vehicle comprising:
a body including a passenger compartment;
a pair of front wheels;
a pair of rear wheels; and
a frame supporting the body, the pair of front wheels, and the pair of rear wheels, the frame including:
a bumper support frame member; and
a longitudinal frame member coupled to the bumper support frame member, the longitudinal frame member including a rail member having an outboard rail element, an inboard rail element, an upper rail element, and a lower rail element, the upper rail element and the lower rail element extending between and connecting with the outboard rail element and the inboard rail element an asymmetric crash response, wherein the outboard rail element exhibits a first response to an axial force and the inboard rail element exhibits a second response to the axial force, the second response being greater than the first response.

8. The vehicle according to claim 7, wherein the outboard rail element includes a first thickness and the inboard rail element includes a second thickness that is greater than the first thickness.

9. The vehicle according to claim 7, further comprising at least one cross member extending between the inboard rail element and the outboard rail element spaced from the upper rail element and the lower rail element, the at least one cross member defining first and second cells that extend longitudinally through the rail member.

10. The vehicle according to claim 7, further comprising an insert extending through the bumper support frame member to the rail member.

11. The vehicle according to claim 10, wherein in the insert is directly attached to the outboard rail element.

12. The vehicle according to claim 11, wherein the insert includes a first insert directly attached to the outboard rail element at the upper rail element and a second insert directly attached to the outboard rail element at the lower rail element.

13. A method of forming a vehicle frame comprising:
forming a longitudinal frame member having an asymmetric crash response, wherein forming the rail member includes forming the outboard rail element to exhibit a first response to an axial force and forming the inboard rail element to exhibit a second response to the axial force that is greater than the first response.

14. The method of claim 13, wherein forming the longitudinal frame member includes forming a rail member having an outboard rail element, an inboard rail element, an upper rail element, and a lower rail element.

15. The method of claim 13, further comprising:
connecting a bumper support frame member to the longitudinal rail member; and
providing an insert in the bumper support frame member that directly connected with the outboard rail element.

* * * * *